United States Patent [19]
Aharon

[11] Patent Number: 4,803,498
[45] Date of Patent: Feb. 7, 1989

[54] LASER PRINTER RECORDING SYSTEM

[75] Inventor: Oren Aharon, Haifa, Israel

[73] Assignee: Blaser Industries, Incorporated, Los Angeles, Calif.

[21] Appl. No.: 72,464

[22] Filed: Jul. 13, 1987

[51] Int. Cl.$^4$ .................. G01D 9/42; G02B 26/08
[52] U.S. Cl. .................................... 346/108; 346/160; 350/65
[58] Field of Search ............. 346/108, 107 R, 76 L, 346/160; 358/296, 300, 302; 350/6.5, 6.6, 6.9, 6.91

[56] References Cited

U.S. PATENT DOCUMENTS

| | | | |
|---|---|---|---|
| 4,037,231 | 7/1977 | Broyles | 346/108 |
| 4,108,532 | 8/1978 | Minoura | 346/108 |
| 4,123,147 | 10/1978 | Hill | 350/6.5 |
| 4,155,620 | 5/1979 | Rawson | 350/6.6 |
| 4,179,183 | 12/1979 | Tateoka | 350/6.1 |
| 4,230,902 | 10/1980 | Hug | 346/76 L |
| 4,247,160 | 1/1981 | Brueggemann | 350/6.8 |
| 4,255,040 | 3/1981 | Weigl | 355/3 R |
| 4,344,677 | 8/1982 | Steurmer | 346/108 |
| 4,400,063 | 8/1983 | Hayashida | 350/6.91 |
| 4,421,387 | 12/1983 | Sprague | 350/356 |
| 4,435,733 | 3/1984 | Tagawa | 358/302 |
| 4,512,625 | 4/1985 | Brueggemann | 350/6.8 |

OTHER PUBLICATIONS

Brueggemann, Proceedings, V. 554, 1985 International Lens Design Conference, 10–23 Jun. 1985, pp. 457–462.
Grant, Optical-Mechanical Design of the IBM 6670 Laser Printhead, SPIE, vol. 200, Laser Recording and Information Handling, 1979, pp. 195–199.

*Primary Examiner*—E. A. Goldberg
*Assistant Examiner*—Mark Reinhart
*Attorney, Agent, or Firm*—Ratner & Prestia

[57] ABSTRACT

An optical scanning system scans a light beam across a target. A transmissive optical element receives a light beam from a laser light source and transmits the beam to the target. A mechanical oscillator coupled to the optical element oscillates the optical element and causes the transmitted light to scan across the target. The optical element may be at least one transmissive lens with a magnification ratio greater than one. Thus the relatively small distance of oscillation of the optical assembly results in a relatively larger distance of scanning across the target. The target may be a photosensitive recording medium having an image forming surface for recording an image and transferring the image to paper.

2 Claims, 3 Drawing Sheets

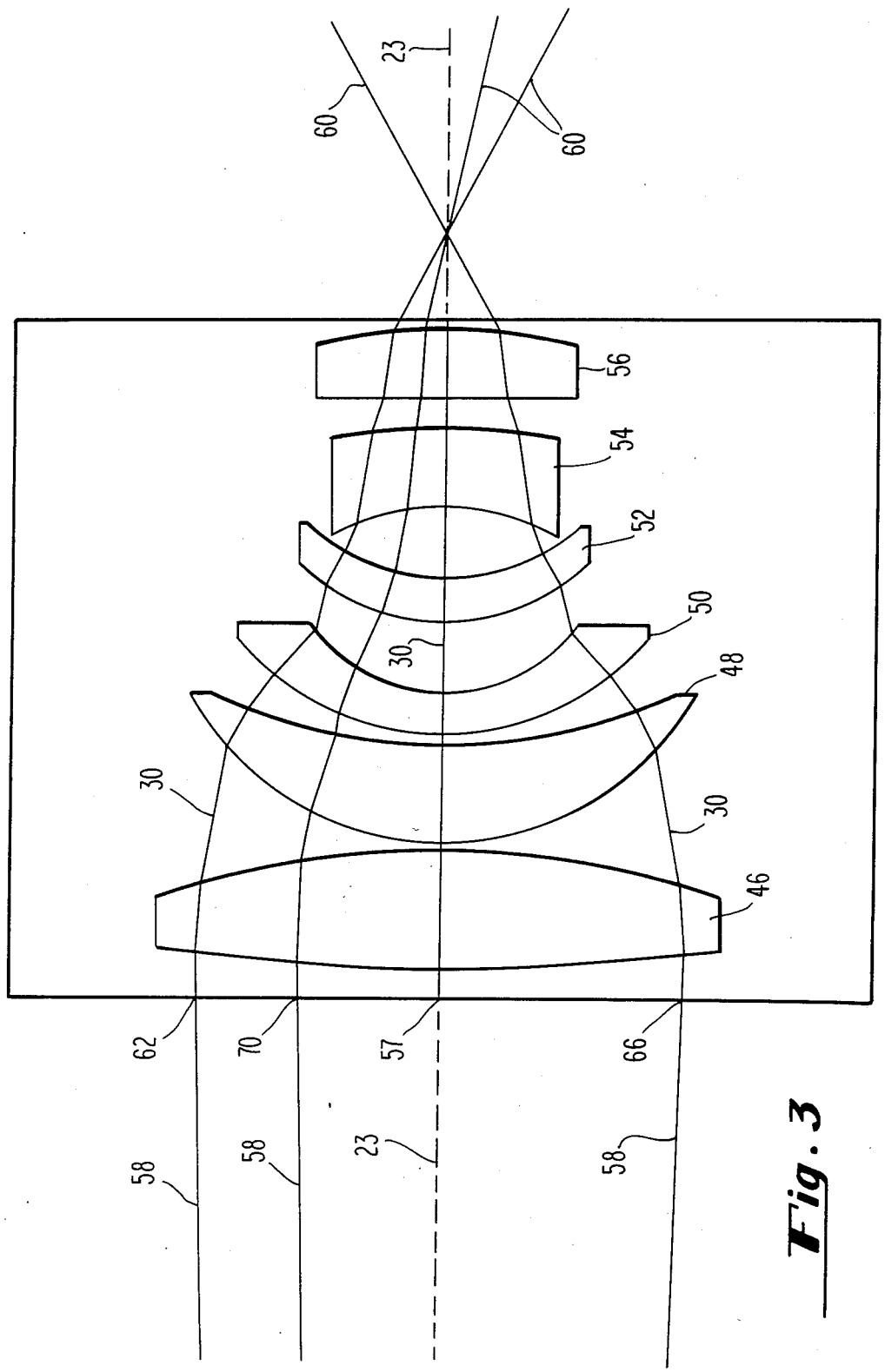

LASER PRINTER RECORDING SYSTEM

BACKGROUND OF THE INVENTION

A. Field of the Invention

This invention relates to laser printers and in particular to scanning of a photoreceptor drum in a laser printer.

B. Background Art

Laser printers require that a laser beam, usually an encoded laser beam, be scanned across a photoreceptor drum to create an image. The image created on the photoreceptor drum may then be transferred to a medium such as paper. In U.S. Pat. No. 4,054,928, issued to Butler, a laser operated scanning and printing system for performing this scanning is disclosed. Butler mechanically advanced the scanned medium to produce a scanned image with a fixed laser light source. This provided the scanning required for printing but it required a large mechanical device unsuited for high speed printing in a commercial setting.

In U.S. Pat. No. 4,037,231 issued to Broyles, a flying spot laser printer uses a rotating mirror to direct a laser light beam across a photoreceptor surface Broyles' system thus eliminated the time consuming mechanical advancement of the scanned medium. However, because the mirror had only two reflective surfaces, the laser light containing information to be transmitted during the scan was interrupted for a large part of the rotational period of the mirror to allow for the correct positioning of the mirror. Thus an undesirable time delay was present for each scan of the spot across the photoreceptor surface until a reflective surface was in position.

In U.S. Pat. No. 4,344,677, issued to Stuermer, multiple scanning beams produced a shortened scan rate. This design, however, also required the use of a mirror with two reflective surfaces, thus limiting the period of time during which a scan could take place because of the delay in positioning the reflective surface.

U.S. Pat. No. 4,230,902 issued to Hug, shows another example of a flying spot scanning system for a laser printer incorporating a photoreceptor drum as scanned medium A scanning polygon with a plurality of contiguous facets provided a flying spot scan. The use of a polyhedron mirror reduced the delay due to the incorrect position of the mirrored surfaces. However, the polygon did not prevent optical distortions that may be caused by the rotating flat geometry. Removal of this distortion requires the use of a large expensive cylindrical lens. Additionally, the polygon itself was large and very expensive.

In U.S. Pat. No. 4,435,733 issued to Tagawa, a laser printer is disclosed which used a rotating polyhedron mirror to direct the laser beam to the photoreceptor drum. The system of Tagawa also produced optical distortions that required the use of an expensive cylindrical lens to compensate for optical runout effects. The rotating polyhedron was very large and expensive, as previously described.

In U.S. Pat. No. 4,255,040 issued to Weigl, a xerographic printer that uses an oscillating galvanometer mirror to overlay scanned data on a xerographic image is disclosed This device uses a precisely calibrated galvanometer mirror that requires frequent adjustment. However, the overlay did not meet the need for line-by-line scanning of encoded data onto a drum.

In U.S. Pat. No. 4,520,370 issued to Fuji, a thermal printer is disclosed that is used to print on continuous web material This printer uses a combination of a rotating polygon mirror and galvanometer mirror to produce a scan Although this device represents an advance for web printing, the rotating polygon mirror still required corrective optics which were expensive.

In U.S. Pat. No. 4,376,568 and U.S. Pat. No. 4,421,387 issued to Sprague, a light modulator scanner is disclosed which replaces the mirror described by Broyles, Hug and Tagawa with a device which employs matched pairs of electrodes to create electro-optic interaction to modulate reflected laser light This device, however, requires a set of electrodes for every point along the scanning line, as well as the use of exotic crystals. Such a device is expensive to construct.

SUMMARY OF THE INVENTION

An optical scanning system scans a light beam across a target. A transmissive optical element receives a light beam from a laser light source and transmits the beam to the target A mechanical oscillator coupled to the optical element oscillates the optical element and causes the transmitted light to scan across the target.

BRIEF DESCRIPTION OF THE DRAWINGS

FIG. 3 shows a more detailed representation of the optical assembly of FIGS. 1A–C.

DETAILED DESCRIPTION OF THE INVENTION

Figure 1A:
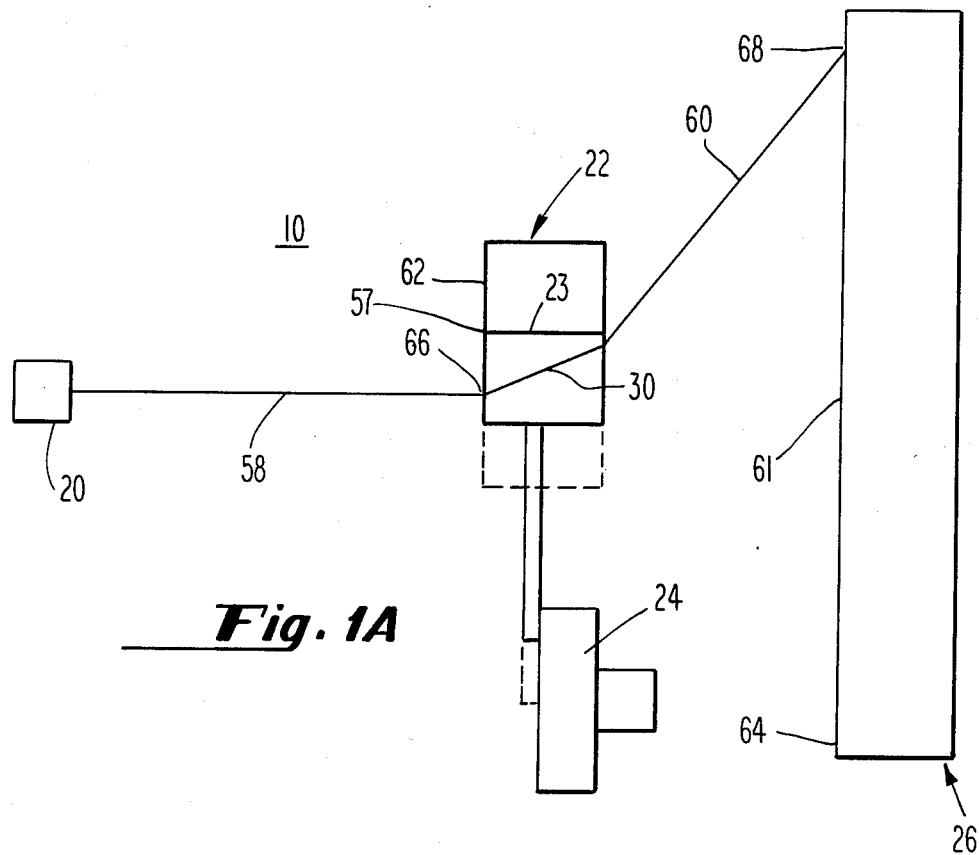
FIGS. 1A–1C show a vibrating lens system of the present invention.
Figure 1B:
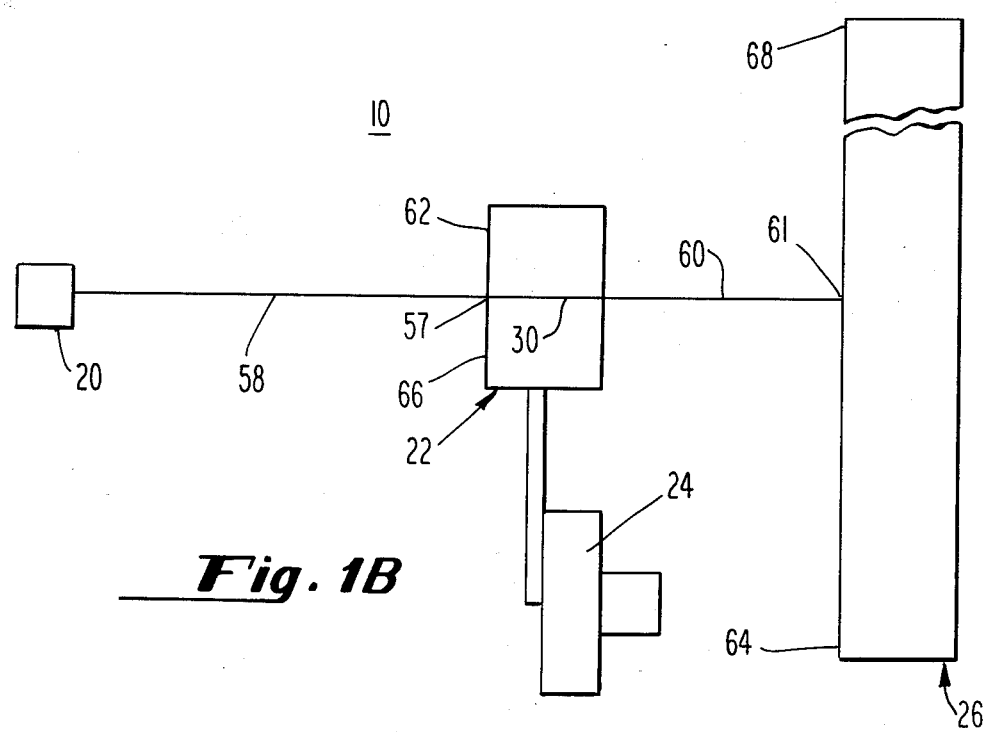
Figure 1C:
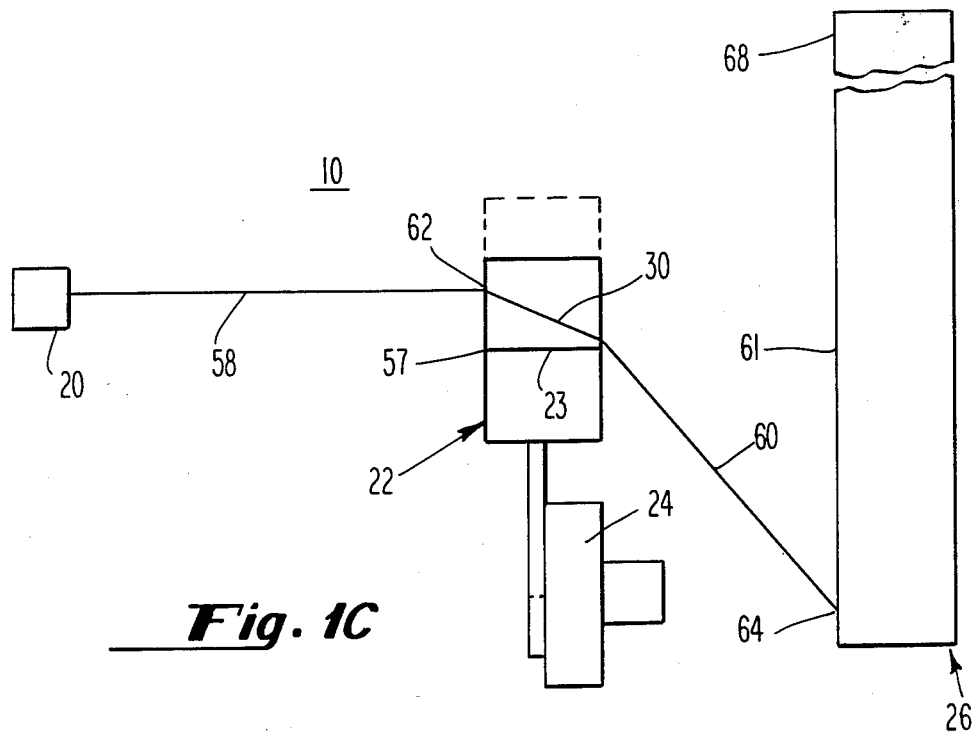

Referring now to FIGS. 1A–C, flying spot scanning system 10 is shown. System 10 comprises stationary semiconductor laser diode 20, transmissive optical assembly 22, slider crank assembly 24, and photoreceptor drum 26. Laser diode 20 generates laser light beam 58, which travels to optical assembly 22 and is transmitted therethrough to photoreceptor drum 26. Slider crank assembly 24 causes assembly 22 to oscillate up and down Laser beam 58 enters optical assembly 22 at point 66 when assembly 22 is at the uppermost limit of its travel and enters assembly 22 at point 62 when assembly 22 is at the lowermost limit of its travel. Beam 58 enters assembly 22 at point 57 when assembly 22 is at the center of its travel.

When assembly 22 is at the center of its travel and light beam 58 enters optical assembly 22 at point 57, light beam 30 travels through optical assembly 22 and is transmitted as beam 60 to photoreceptor drum 26 at point 61. When slider crank 24 displaces optical assembly 22 upwards and downwards, beam 58 enters optical assembly 22 between points 62, 66 and is transmitted to drum 26 between point 68 and point 64.

Thus, relatively small displacements of optical assembly 22 cause transmitted beam 60 to scan drum 26 the entire distance between point 64 and point 68.

This provides an efficient way to achieve a flying spot scan of drum 26 and create an image on drum 26. System 10 may be relatively small and inexpensive compared with rotating polygon systems because optical assembly 22 is relatively small and inexpensive while still providing quality resolution.

The scanned length from point 64 to point 68 along drum 26 is related to the travel distance of assembly 22 according to the magnification ratio of optical assembly 22.

Photoreceptor drum 26 is a conventional photosensitive recording medium having an image forming surface for recording an image which may be encoded in beam 58. The image formed on drum 26 may be transferred to another medium such as paper in a conventional manner. Thus system 10 may provide an image for a conventional laser printer by replacing the conventional larger optics of the conventional printer.

Referring now in particular to FIG. 1A slider crank assembly 24 moves optical assembly 22 to its top position. Laser diode 20 generates laser light beam 58, which travels to optical assembly 22. Laser light beam 58 enters optical assembly 22 paraxial to optical axis 23 at point 66, displaced from optical axis 23 by a distance equal to the distance that slider crank assembly 24 moved optical assembly 22. Laser beam 30 travels through optical assembly 22, and emerges as laser light beam 60, which strikes position 68 of photoreceptor drum 26.

Referring now in particular to FIG. 1B, slider crank assembly 24 moves optical assembly 22 to the center position. Laser diode 20 generates laser light beam 58, which travels to optical assembly 22. Laser light beam 58 enters optical assembly 22 at point 57. Laser beam 30 travels through optical assembly 22 along optical axis 23, and is transmitted as laser light beam 60, which is focused on the center point of the scan of photoreceptor drum 26, position 61.

Referring now in particular to FIG. 1C, slider crank assembly 24 moves optical assembly 22 to the bottom position Laser diode 20 generates laser light beam 58, which travels to optical assembly 22. Laser light beam 62 enters optical assembly 22 at point 62, paraxial to optical axis 23, but displaced from optical axis 23 by a distance equal to the distance that slider crank assembly 24 moved optical assembly 22. Laser beam 30 travels through optical assembly 22, and emerges as laser light beam 60, which is focused on the bottom position of the scan of photoreceptor drum 26, position 64.

The oscillations of slider crank assembly 24 and the conventional rotating advances of photoreceptor drum 26 (not shown) are synchronized so that laser beam 60 performs a line by line flying spot scan of photoreceptor drum 26 to provide an image on drum 26 which may be transferred to a medium such as paper (not shown). While a slider crank assembly is shown, it will be understood by those skilled in the art that any method of causing optical assembly 22 to oscillate substantially parallel to the scanned line and perpendicular to the axis of the light beam may be used. The reciprocating motion of optical assembly 22 may be substantially linear. It will be further understood that the drawings are not to scale.

Figure 2:
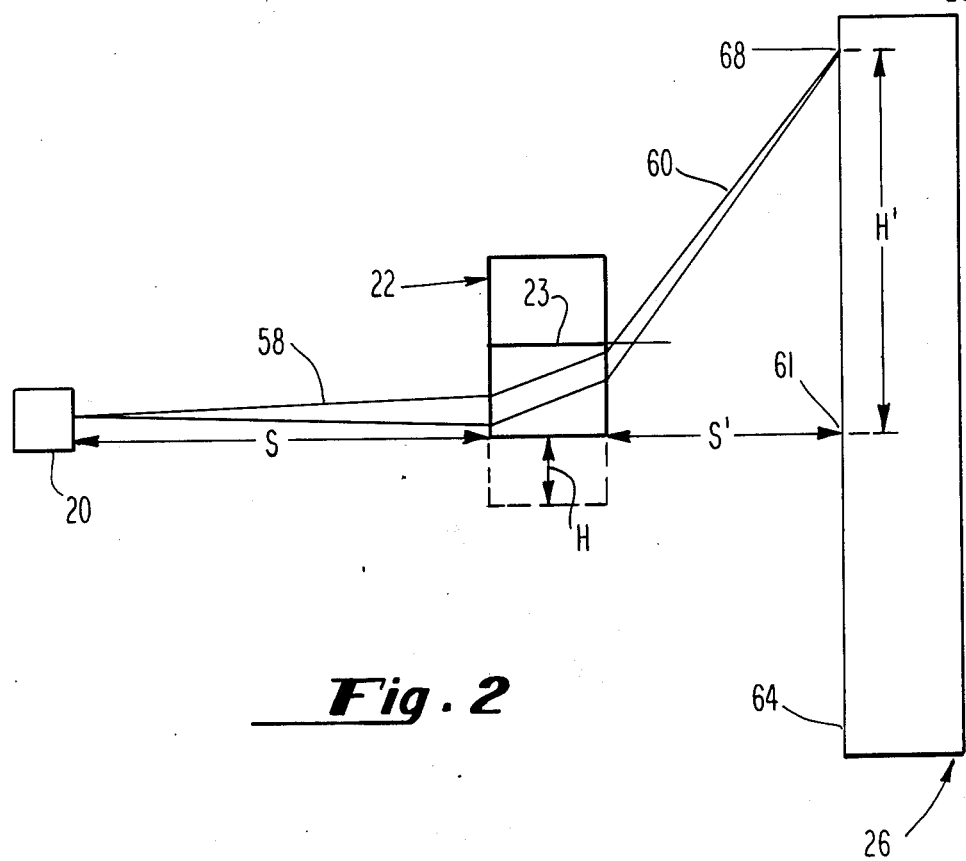
FIG. 2 shows a representation of the focal length characteristics and magnification ratios of optical assembly 22 of FIGS. 1A–C.

Referring now to FIG. 2, optical assembly 22 has a focal length F such that slightly diffused laser light 58 generated by laser diode 20 converges as beam 60 and strikes photoreceptor 26 as a focused spot at point 68. The focal length F of assembly 22 is determined by the following formula:

$$1/F = 1/S + 1/S'$$

where F is the focal length of optical assembly 22, S is the distance from laser diode 20 to optical assembly 22, and S' is the distance from optical assembly 22 to photoreceptor drum 26.

Because the magnification ratio of optical assembly 22 is greater than one and because of the placement of optical assembly 22 relative to laser diode 20 and photoreceptor drum 26, a relatively small movement of optical assembly 22 causes a complete scan of photoreceptor drum 26. The scanned distance H' along drum 26 between point 64 and point 68 is thus much larger than the distance H which optical assembly 22 travels during its oscillation. The amount of movement required by optical assembly 22 to accomplish a displacement of laser light 60 from center point 61 of photoreceptor drum 26 to top point 68 of photoreceptor drum 26 is thus determined by the magnification ratio of assembly 22 which may be be expressed in the following optical formulas:

$$M = S'/S$$

$$M = H'/H$$

where S is the distance from laser diode 20 to optical assembly 22, S' is the distance from optical assembly 22 to photoreceptor drum 26, H is the distance optical assembly travels upward or downward from its center point, and H' is the lateral distance between point 68 and point 61 on photoreceptor drum 26.

Referring now to FIG. 3, a more detailed representation of the preferred embodiment of optical assembly 22 is shown. Paraxial laser light beam 58 entering optical assembly 22 at any point 70 between points 57,62 emerges from assembly 22 as laser light beam 60 and strikes photoreceptor drum 26 between point 64 and point 68.

Optical assembly 22 is composed of lenses 46, 48, 50, 52, 54, 56 and having optical axis 23. Thus system 10 is a transmissive optical system rather than a reflective system. In the preferred embodiment, optical assembly 22 is composed of six lenses, but it will be understood by those skilled in the art that optical assembly 22 may contain from one lens to over six lenses. The selection of the number of lenses depends on the desired resolution, the size of optical assembly 22, the length of the scan along drum 26 and other considerations understood by those skilled in the art.

The quality of the spot produced is highest when light beam 58 enters a lens in a region where the lens surface is near normal to the optical axis and hence all angles of incidence and refraction are small. This provides a restraint on the oscillation distance of assembly 22 and hence on the scanned distance along drum 26. To ease this restraint, additional lenses may be provided within assembly 22 in a manner understood by those skilled in the art. Thus there is a trade-off between optical distortions and aberration effects on the one hand and additional lenses on the other. The additional lenses may be within assembly 22 and vibrate with assembly 22 or may be stationary lenses (not shown) outside of assembly 22.

In an alternate embodiment (not shown), optical assembly 22 may be vibrated in two dimensions rather than in one dimension. The vibration in the second dimension, orthogonal to the first dimension and to the direction of light beam 58, may allow system 10 to scan drum 26 in two dimensions rather than the one direction illustrated between points 64,68.

I claim:

1. A laser printer recording system comprising:
a laser light source for generating a beam of light;
a photoresistive recording medium having an image forming surface disposed perpendicular to the path of said beam of light as it emanates from said light source for recording an image as said beam of light is scanned repetitively across said image forming surface along straight lines;
a transmissive optical unit having a magnification ratio greater than one positioned between said laser light source and said photoresistive recording medium and through which said beam of light passes from said laser light source to said photoresistive recording medium;
and a slider crank assembly coupled to said transmissive optical unit for imparting oscillatory motion to said transmissive optical unit along a straight-line path parallel to said image forming surface of said photoresistive recording medium to refract said beam of light in increasing amounts as said transmissive optical unit is displaced from the path of said beam of light as it emanates from said light source, thereby scanning said beam of light across said image forming surface along a straight line for each cycle of oscillation of said transmissive optical unit over a distance greater than the distance between the end points of displacements of said transmissive optical unit.

2. A laser printer recording system according to claim 1 further including at least one stationary lens for receiving said beam of light first transmitted by said transmissive optical unit and second transmitting said beam of light to said photoresistive recording medium.

* * * * *